US011003413B2

(12) United States Patent
LaRosa et al.

(10) Patent No.: US 11,003,413 B2
(45) Date of Patent: May 11, 2021

(54) SYSTEM AND METHOD FOR SELECTIVE REMOVAL OF AUDIO CONTENT FROM A MIXED AUDIO RECORDING

(71) Applicant: Google Inc., Mountain View, CA (US)

(72) Inventors: Christopher Russell LaRosa, San Francisco, CA (US); Sam Kvaalen, San Francisco, CA (US); Thomas Chadwick Walters, San Francisco, CA (US); Richard Francis Lyon, Los Altos, CA (US); Robert Steven Glickstein, San Rafael, CA (US); Rushabh Ashok Doshi, Menlo Park, CA (US); Molly Castle Nix, San Francisco, CA (US); Jason Matthew Toff, San Francisco, CA (US)

(73) Assignee: Google LLC, Mountain View, CA (US)

( * ) Notice: Subject to any disclaimer, the term of this patent is extended or adjusted under 35 U.S.C. 154(b) by 663 days.

(21) Appl. No.: 14/920,463

(22) Filed: Oct. 22, 2015

(65) Prior Publication Data

US 2016/0041807 A1 Feb. 11, 2016

Related U.S. Application Data

(63) Continuation of application No. 13/730,076, filed on Dec. 28, 2012, now Pat. No. 9,195,431.

(Continued)

(51) Int. Cl.
*G06F 17/00* (2019.01)
*G06F 3/16* (2006.01)
(Continued)

(52) U.S. Cl.
CPC .............. *G06F 3/16* (2013.01); *G10H 1/0008* (2013.01); *G10H 1/0025* (2013.01);
(Continued)

(58) Field of Classification Search
CPC ...... G06F 3/16; G10H 1/0008; G10H 1/0025; G10H 2210/021; G10H 2210/125;
(Continued)

(56) References Cited

U.S. PATENT DOCUMENTS 5,148,484 A    9/1992   Kane et al.
6,006,332 A * 12/1999   Rabne .................... G06F 21/10
                                            705/51
(Continued)

FOREIGN PATENT DOCUMENTS

CN        1383056       12/2002
CN        1656471        8/2005
(Continued)

OTHER PUBLICATIONS

Office Action for Chinese Patent Application No. CN 201380040395. 1, dated Jun. 28, 2016, 14 Pages.
(Continued)

*Primary Examiner* — Paul C McCord
(74) *Attorney, Agent, or Firm* — Lowenstein Sandler LLP

(57) ABSTRACT

Systems and techniques for removing a sound recording from an audio recording (e.g., an audio recording embedded in a media file) are presented. The system can include an identification component, a first subtraction component and a second subtraction component. The identification component identifies a sound recording in a mixed audio recording. The first subtraction component determines a local linear transformation of the sound recording and subtracts the local linear transformation of the sound recording from the mixed audio recording to generate a new mixed audio recording. The second subtraction component compares one or more segments of the sound recording with one or more corresponding segments of the new mixed audio recording and reduces a power level of the new mixed audio recording based at least in part on correlation of the one or more corresponding segments with the one or more segments.

19 Claims, 12 Drawing Sheets

Related U.S. Application Data

(60) Provisional application No. 61/661,225, filed on Jun. 18, 2012.

(51) Int. Cl.
*G11B 27/034* (2006.01)
*G11B 27/28* (2006.01)
*G10L 21/0272* (2013.01)
*G10H 1/00* (2006.01)
*H04H 60/04* (2008.01)

(52) U.S. Cl.
CPC ........ *G10L 21/0272* (2013.01); *G11B 27/034* (2013.01); *G11B 27/28* (2013.01); *G10H 2210/021* (2013.01); *G10H 2210/125* (2013.01); *H04H 60/04* (2013.01); *Y02D 30/70* (2020.08)

(58) Field of Classification Search
CPC ... G10L 21/0272; G11B 27/034; G11B 27/28; H04H 60/04
USPC .......................................................... 700/94
See application file for complete search history.

(56) References Cited

U.S. PATENT DOCUMENTS

| | | | |
|---|---|---|---|
| 6,714,921 B2* | 3/2004 | Stefik | G06F 21/10 705/55 |
| 7,281,272 B1* | 10/2007 | Rubin | H04N 1/00244 726/26 |
| 7,319,185 B1* | 1/2008 | Wieder | G10H 1/0041 84/609 |
| 7,366,908 B2* | 4/2008 | Tewfik | G06T 1/0028 375/E7.04 |
| 8,121,714 B2 | 2/2012 | Yamashita et al. | |
| 8,397,056 B1* | 3/2013 | Malks | H04L 63/10 709/203 |
| 8,548,920 B2 | 10/2013 | Wang | |
| 8,886,635 B2 | 11/2014 | Cho et al. | |
| 2002/0069098 A1* | 6/2002 | Schmidt | G06Q 10/10 709/206 |
| 2003/0007782 A1* | 1/2003 | Kamen | G11B 27/105 386/212 |
| 2004/0015999 A1* | 1/2004 | Carlucci | H04N 5/76 725/136 |
| 2004/0220791 A1* | 11/2004 | Lamkin | G06F 17/30017 703/11 |
| 2006/0167882 A1* | 7/2006 | Aydar | G06F 21/10 |
| 2007/0021959 A1 | 1/2007 | Goto | |
| 2007/0033528 A1* | 2/2007 | Merril | G02B 26/0816 715/732 |
| 2007/0156594 A1 | 7/2007 | McGucken | |
| 2007/0274519 A1* | 11/2007 | Cohen | G11B 27/034 380/201 |
| 2007/0291958 A1 | 12/2007 | Jehan | |
| 2008/0028422 A1* | 1/2008 | Cohen | G06F 21/10 725/32 |
| 2008/0109368 A1* | 5/2008 | Read | G06F 21/10 705/59 |
| 2008/0114665 A1* | 5/2008 | Teegarden | G06Q 10/101 705/300 |
| 2008/0114836 A1* | 5/2008 | Zellner | G06Q 30/06 709/206 |
| 2008/0172747 A1* | 7/2008 | Hurtado | G06Q 20/3829 726/26 |
| 2008/0208692 A1* | 8/2008 | Garaventi | G06Q 20/102 705/14.69 |
| 2008/0250065 A1* | 10/2008 | Barrs | G06F 17/30017 |
| 2009/0007221 A1* | 1/2009 | Kim | G06F 21/10 726/1 |
| 2009/0106261 A1* | 4/2009 | Nagasaka | G06F 17/30017 |
| 2009/0144325 A1 | 6/2009 | Chastagnol et al. | |
| 2009/0204639 A1* | 8/2009 | Barrett | G06F 17/30056 |
| 2009/0217343 A1* | 8/2009 | Bellwood | G06F 21/10 726/1 |
| 2009/0222118 A1* | 9/2009 | Oh | G10L 19/008 700/94 |
| 2009/0313226 A1 | 12/2009 | Bennett | |
| 2009/0316894 A1 | 12/2009 | Li | |
| 2010/0146502 A1* | 6/2010 | Zalewski | A63F 13/10 718/1 |
| 2010/0174608 A1* | 7/2010 | Harkness | G06F 21/10 705/14.53 |
| 2010/0306860 A1* | 12/2010 | Risan | G06F 17/30017 726/33 |
| 2011/0010778 A1* | 1/2011 | Risan | G06F 21/10 726/30 |
| 2011/0142257 A1 | 6/2011 | Goodwin et al. | |
| 2012/0004911 A1 | 1/2012 | Quan | |
| 2012/0047177 A1* | 2/2012 | Bowden | G06Q 10/10 707/785 |
| 2012/0284804 A1* | 11/2012 | Lindquist | G06F 21/10 726/29 |
| 2013/0070093 A1* | 3/2013 | Rivera | G11B 27/002 348/143 |
| 2014/0215643 A1* | 7/2014 | Wold | G06F 21/10 726/32 |

FOREIGN PATENT DOCUMENTS

| | | |
|---|---|---|
| CN | 1659653 | 8/2005 |
| KR | 101123865 B1 | 3/2012 |
| WO | WO 9908380 A1 | 2/1999 |
| WO | WO 2008140238 A2 | 11/2008 |
| WO | WO 2011/078418 A1 | 6/2011 |

OTHER PUBLICATIONS

Adobe Audition Manual: Copyright 2003.
Avendano, C., "Acoustic Echo Suppression in the STFT Domain," IEEE Workshop on Applications of Signal Processing to Audio and Acoustics, New Paltz, New York, Oct. 21-24, 2001, pp. 175-178.
Barbeau, L., et al., "Speech Enhancement in the Presence of Interfering Music and Noise," Technical Report 87-09, INRS-Telecommunications, Jan. 1987, 76 pages, University of Quebec.
International Search Report and Written Opinion for International Application Serial No. PCT/US2013/45044, dated Sep. 27, 2013, 10 pages.
Lee, H., et al., "Recovery of Speech Signal from Contaminated Input," Proceedings of the 3rd International Conference on Control Theory and Applications, Pretoria, South Africa, Dec. 2001, pp. 547-551.
Nesta, F., et al., "Batch-Online Semi-Blind Source Separation Applied to Multi-Channel Acoustic Echo Cancellation," IEEE Transactions on Audio, Speech, and Language Processing, Mar. 2011, vol. 19, No. 3, pp. 583-599.
Spectral Subtraction; Copyright 2000.
Toward Intelligent Music Information Retrieval; Copyright 2009.
Widrow, B., et al., "Adaptive Noise Cancelling: Principles and Applications," Proceedings of the IEEE, Dec. 1975, vol. 63, No. 12, pp. 1692-1717.
Wung, J., et al., "A System Approach to Residual Echo Suppression in Robust Hands-Free Teleconferencing," ICASSP, 2011, pp. 445-448.
Extended European Search Report for European Patent Application No. EP 13806659.2, dated Feb. 8, 2016, 7 pages.
Lohmann, F., "YouTube's Content ID (C)ensorship Problem Illustrated," Electronic Frontier Foundation, Marsh 2, 2010, 3 pages, [online] [retrieved on Feb. 1, 2016] Retrieved from the internet <URL:https://www.eff.org/deeplinks/2010/03/youtubes-content-id-c-ensorship-problem>.
Office Action for European Patent Application No. EP 13806659.2, dated Oct. 25, 2018.
Office Action for Chinese Patent Application No. CN 201710127426.7, dated Apr. 10, 2019.

(56) References Cited

OTHER PUBLICATIONS

Notice of Grant for Chinese Patent Application No. CN 201710127426.7, dated Oct. 28, 2019.
Extended European Search Report for European Patent Application No., EP 19216242.8-1209, dated Mar. 13, 2020, 7 pages.

* cited by examiner

SYSTEM AND METHOD FOR SELECTIVE REMOVAL OF AUDIO CONTENT FROM A MIXED AUDIO RECORDING

CROSS REFERENCE TO RELATED APPLICATIONS

This application is a continuation of U.S. patent application Ser. No. 13/730,076, filed on Dec. 28, 2012 which claims the benefit of U.S. Provisional Application No. 61/661,225, filed Jun. 18, 2012, the entirety of each is incorporated herein by reference.

TECHNICAL FIELD

This disclosure relates generally to audio processing, and more specifically, to selectively removing audio content from a mixed audio recording.

BACKGROUND

Often times, an audio recording (e.g., an audio file) includes multiple sound recordings. For example, an audio recording can be a mixed audio recording as a result of acoustic capture (e.g., a microphone) or audio mixing (e.g., an audio process that mixes multiple sound recordings into a single audio recording). In one example, a mixed audio recording can include speech (e.g., audio from someone speaking) interlaced with a recorded song. However, in certain scenarios, it is desirable to remove one or more sound recordings (e.g., a recorded song) from an audio recording.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes an identification component, a first subtraction component and a second subtraction component. The identification component identifies a sound recording in a mixed audio recording. The first subtraction component determines a local linear transformation of the sound recording and subtracts the local linear transformation of the sound recording from the mixed audio recording to generate a new mixed audio recording. The second subtraction component compares one or more segments of the sound recording with one or more corresponding segments of the new mixed audio recording and reduces a power level of the new mixed audio recording based at least in part on correlation of the one or more corresponding segments with the one or more segments. In one example, the one or more segments and/or the one or more corresponding segments are spectro-temporal segments.

In accordance with another implementation, a system includes an identification component, a processing component and a modification component. The identification component identifies one or more sound recordings in a first audio file embedded in a media file. The processing component implements one or more signal processing algorithms to remove at least one of the one or more sound recordings from the first audio file to generate a second audio file. The modification component replaces the first audio file embedded in the media file with the second audio file.

Additionally, a non-limiting implementation provides for identifying a sound recording in a mixed audio recording, determining a local linear transformation of the sound recording, subtracting the local linear transformation of the sound recording from the mixed audio recording to generate a new mixed audio recording, comparing one or more segments of the sound recording with one or more corresponding segments of the new mixed audio recording, and reducing a power level of the new mixed audio recording based at least in part on correlation of the one or more corresponding segments with the one or more segments.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
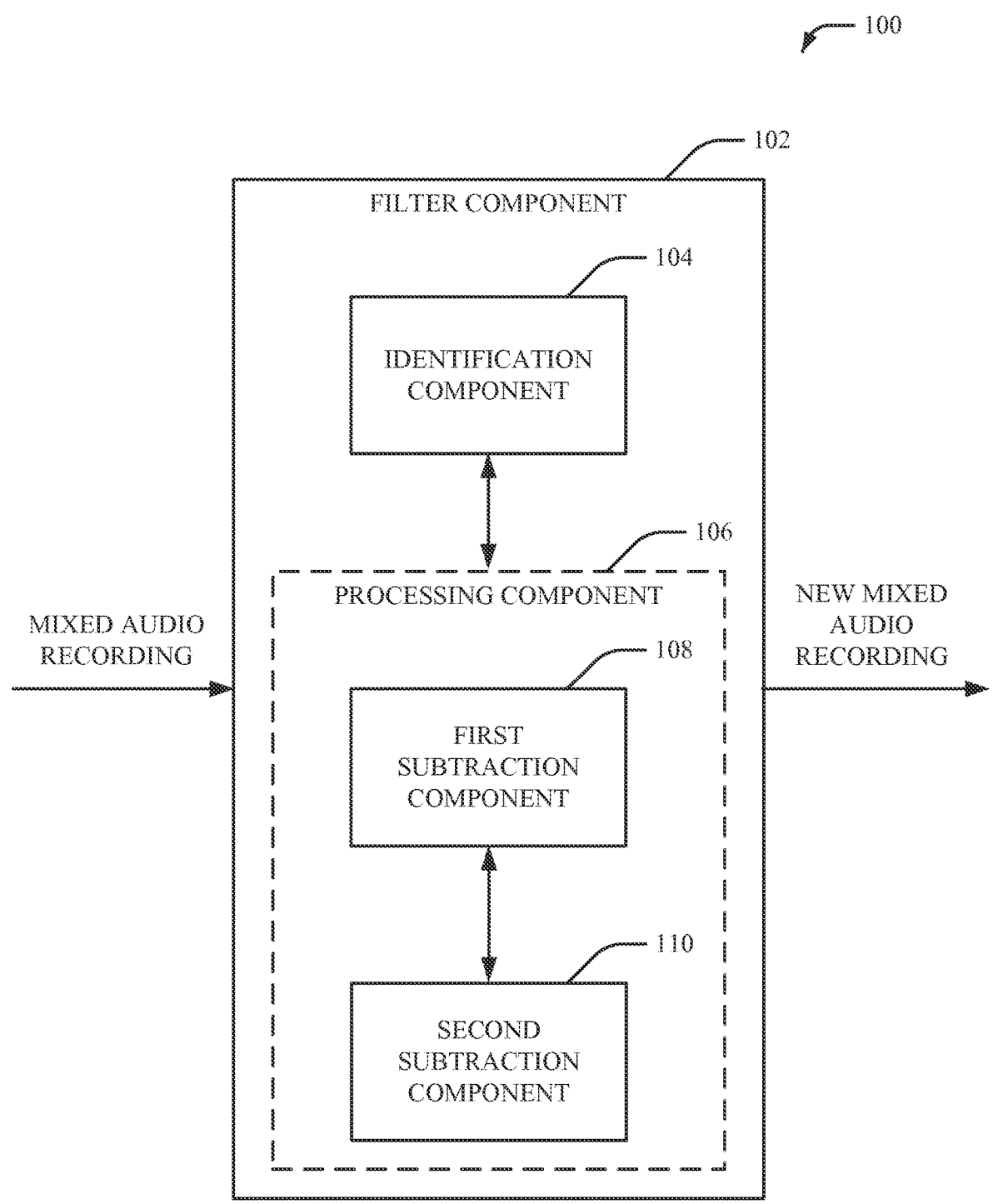
FIG. 1 illustrates a high-level block diagram of an example filtering component, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Many conventional service providers allow users to upload media content (e.g., audio and/or video content) to a server (e.g., a media content server). The media content can then be delivered (e.g., streamed) to other users. Typically, the service providers provide the network infrastructure for the users, but very little else. Therefore, these service providers have very limited control over what media content is being uploaded and/or streamed by users, such as, e.g., copyrighted media content.

Current copyright protection schemes compare uploaded media content to an index of validated and protected content. A copyright holder can upload the copyrighted media content as a reference. Additionally, the copyright holder can set a policy for dealing with matches (e.g., media content uploaded by a user that matches the copyrighted media content). If a match is made, a copyright claim is generated against the uploaded media content. For example, a media file (e.g., a video file) uploaded to a server (e.g., a media content server) by a user can include copyrighted media content (e.g., one or more copyrighted songs). Therefore, depending on the policy set by the copyright holder, the copyrighted media content may need to be removed from the media file.

One conventional solution for removing the copyrighted content from the media file (e.g., the video file) includes muting the copyrighted content (e.g., muting the copyrighted song). An alternate solution includes removing the media file from the server. However, conventional techniques for removing copyrighted audio content from a media file (e.g., a video file) uploaded to a server do not efficiently remove copyrighted audio content from a mixed audio recording (e.g., an audio recording embedded in the media file) with multiple sound recordings. For example, a sound recording for a video file can include someone speaking as well as a song in the background. However, the song in the background can be copyrighted content. As a result, it is desirable to remove the song (e.g., the copyrighted content) from the video file while preserving the recorded speech (e.g., the non-song audio content).

To that end, techniques for selectively removing audio content from a mixed audio recording are presented. For example, one or more songs can be removed from a mixed audio recording (e.g., a soundtrack). Systems and methods disclosed herein relate to removing an identified portion of a mixed audio recording while preserving a distinct portion (e.g., a non-copyrighted portion, a non-song portion, etc.) of the mixed audio recording. Therefore, distinct portions (e.g., non-copyrighted portions) of the mixed audio recording can be preserved.

Referring initially to FIG. 1, there is illustrated an example system 100 that selectively removes one or more sound recordings from an audio recording (e.g., an audio recording embedded in a media file), according to an aspect of the subject disclosure. In one example, the system 100 can be implemented on or in connection with a server that hosts user-uploaded media content. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

Specifically, the system 100 can provide a filter component with an identification feature (e.g., identification component 104) and a processing feature (e.g., processing component 106) that can be utilized in most any networking application. The identification feature can identify a sound recording in a mixed audio recording. For example, the identification feature can identify one or more sound recordings in a first audio file embedded in a media file (e.g., a video file). The processing feature can implement one or more signal processing algorithms to remove at least one of the one or more sound recordings from the mixed audio recording (e.g., a first audio file) to generate a new mixed audio recording (e.g., a second audio file).

The processing feature can include a first subtraction feature (e.g., first subtraction component 108) and a second subtraction feature (e.g., second subtraction component 110). The first subtraction feature can determine a local linear transformation of the sound recording. The first subtraction feature can also subtract the local linear transformation of the sound recording from the mixed audio recording (e.g., the first audio file) to generate a new mixed audio recording (e.g., the second audio file). The second subtraction feature can compare one or more segments of the sound recording (e.g., the first audio file) with one or more corresponding segments of the new mixed audio recording (e.g., the second audio file). The second subtraction feature can also reduce a power level of the new mixed audio recording (e.g., the second audio file) based at least in part on correlation of the one or more corresponding segments with the one or more segments. For example, the second subtraction feature can adjust a power level of at least one segment (e.g., at least one of the one or more corresponding segments) of the new mixed audio recording (e.g., the second audio file) based at least in part on correlation of the one or more corresponding segments with the one or more segments.

The system 100 can be employed by various systems, such as, but not limited to network systems, computer network systems, communication systems, router systems, server systems, high availability server systems (e.g., Telecom server systems), Web server systems, file server systems, media server systems, media content server systems, disk array systems, powered insertion board systems, cloud-based systems, and the like.

In particular, the system 100 can include a filter component 102. In FIG. 1, the filter component 102 includes an identification component 104 and a processing component 106. The filter component 102 can receive a mixed audio recording (e.g., MIXED AUDIO RECORDING shown in FIG. 1). For example, the mixed audio recording can be a hybrid sound recording (e.g., a hybrid sound signal, a soundtrack, etc.). The mixed audio recording can include one or more sound recordings (e.g., one or more songs, copyrighted media content, etc.) mixed with other audio recordings (e.g., non-song audio content, speech, etc.). In response to receiving the mixed audio recording, the filter component 102 can generate a new mixed audio recording (e.g., NEW MIXED AUDIO RECORDING shown in FIG. 1). The new mixed audio recording can be an audio recording without at least one of the one or more sound recordings (e.g., one or more songs can be removed from an audio recording). However, the other audio recordings (e.g., the non-song audio content) in the new mixed audio recording can be preserved (e.g., remain intact).

The identification component 104 can identify (or be configured to identify) a sound recording (e.g., one or more sound recordings) in the mixed audio recording (e.g., a first audio file). The sound recording can be a reference sound recording. In one example, the sound recording can be a copyrighted song. The mixed audio recording can be embedded in a media file (e.g., a video file). The media file can be stored on a remote server (e.g., a media content server). In one example, the mixed audio recording can be recorded through acoustic capture (e.g., a microphone). In another example, the mixed audio recording can be an audio mixing (e.g., a mixed audio track).

In one example, the sound recording can be identified by the identification component 104 based at least in part on a previously identified partial segment of the sound recording. For example, a content identification associated with a partial segment of the sound recording can be used to identify which sound recording (e.g., which reference track) to use for subtraction, to identify segments, to determine placement of segments in the sound recording, etc. The identification component 104 can store and/or access a library of identified segments (e.g., previously identified segments). Therefore, the library can be implemented as a cross-reference to identify partial segments. The library can be stored, for example, on a server in communication with the identification component 104. It is to be appreciated that different types of hashing schemes can be implemented to find and/or identify partial segments (e.g., previously identified partial segments).

The processing component 106 can implement (or be configured to implement) one or more signal processing algorithms to remove at least one of the one or more sound recordings from the mixed audio recording (e.g., the first audio file) and/or to generate the new mixed audio recording (e.g., the second audio file). The processing component 106 can include a first subtraction component 108 and a second subtraction component 110.

The first subtraction component 108 can implement one or more signal processing algorithms in the time-domain. For example, the first subtraction component 108 can implement adaptive filtering (e.g., linear filtering). In one example, the first subtraction component 108 can implement coherent subtraction. The coherent subtraction can be based on linear filtering. The first subtraction component 108 can implement time-domain cross-correlation to align the sound recording with the mixed audio recording (e.g., find an ideal alignment). Additionally, the first subtraction component 108 can determine the level (e.g., a sound level, an amplitude level, etc.) of the sound recording in the mixed audio recording. Furthermore, the first subtraction component 108 can identify a starting time and an ending time for the sound recording.

The first subtraction component 108 can determine a local linear transformation of the sound recording. For example, the first subtraction component 108 can find a local linear transformation of the sound recording that is closest (e.g., best matched) to the mixed audio recording. The first subtraction component 108 can subtract the local linear transformation of the sound recording from the mixed audio recording (e.g., the first audio file) to generate the new mixed audio recording (e.g., the second audio file).

The first subtraction component 108 can implement local linear transformation to scale samples of the sound recording at different offsets. In one example, the local linear transformation of the sound recording can be implemented via a local linear filter. The first subtraction component 108 can operate on overlapping blocks of the sound recording. In one example; the first subtraction component 108 can implement a matrix operation to perform the local linear transformation. As such, the new mixed audio recording can be a finite impulse response to filtering performed by the first subtraction component 108. However, it is to be appreciated that other types of filtering operations can be implemented to execute local linear transformation. In one example, the local linear transformation of the sound recording can be implemented via a finite impulse response filter. As such, individual coefficients of the sound recording can be altered on a continuous basis.

The second subtraction component 110 can implement one or more signal processing algorithms in the frequency-domain. The second subtraction component 110 can perform spectral analysis. For example, the second subtraction component 110 can implement spectral subtraction (e.g., non-linear subtraction). In one example, the second subtraction component 110 can implement non-coherent subtraction. The non-coherent subtraction can be based on a power spectrum (e.g., a power spectrum of the new mixed audio recording). The second subtraction component 110 can be implemented to reduce residual audio from the sound recording. For example, the residual sound can be sound of the sound recording that is not cancelled by a linear filter (e.g., the first subtraction component 108).

The second subtraction component 110 can compute (e.g., determine) a full spectrogram for the new mixed audio recording (e.g., the second audio file). The second subtraction component 110 can compare one or more segments of the sound recording with one or more corresponding segments of the new mixed audio recording. For example, the second subtraction component 110 can find one or more segments (e.g., one or more slices) of the sound recording that are spectrally similar to one or more segments (e.g., one or more slices) of the new mixed audio recording. In one example, the one or more segments and/or the one or more corresponding segments can be implemented as spectro-temporal segments. As such, the level of individual frequency bands can be modified within a short temporal slice of audio (e.g., the sound recording and/or the new mixed audio recording). The second subtraction component 110 can split the spectrogram into magnitude and phase.

The second subtraction component 110 can adjust (e.g., reduce) a power level of the new mixed audio recording based at least in part on correlation (e.g., a determined correlation, spectral similarity, etc.) of the one or more corresponding segments with the one or more segments. For example, the second subtraction component 110 can adjust (e.g., reduce) a power level of at least one of the one or more corresponding segments of the new mixed audio recording based at least in part on spectral correlation of the one or more corresponding segments with the one or more segments. In one example, the power level of a particular corresponding segment of the one or more corresponding segments can be reduced to zero in response to a determination that remaining sound in the new mixed audio recording is not relevant (e.g., remaining sound in the new mixed audio recording is below a predetermined threshold level). For example, the power level of a particular corresponding segment of the one or more corresponding segments can be reduced to zero based at least in part on a relevancy level of the particular corresponding segment.

The second subtraction component 110 can compare a magnitude of the one or more segments of the sound recording with a corresponding magnitude of the one or more corresponding segments of the new mixed audio recording. Therefore, one log magnitude spectrum segment (e.g., slice) of the sound recording can be subtracted from one log magnitude spectrum segment (e.g., slice) of the new mixed audio recording. Additionally, variance of the remainder (e.g., as a result of the subtraction) can be determined. For low-variance segments (e.g., slices), the average level of the remainder can be determined.

In one example, the second subtraction component 110 can compare the one or more segments of the sound recording with the one or more corresponding segments of the new mixed audio recording using a short-time Fourier transform (STFT) algorithm. Therefore, the power level of the new mixed audio recording can be selectively reduced as a function of a spectral correlation. As such, the second subtraction component 110 can reduce a power level for different time frequency bins (e.g., reduce power at different frequencies) of the new mixed audio recording. The second subtraction component 110 can re-synthesize the new mixed audio recording using the subtracted magnitude spectrum and the original phase of the new mixed audio recording. As such, the sound recording can be removed from the new mixed audio recording (e.g., the new mixed audio recording can be re-processed without the sound recording). Therefore, one or more songs can be removed from an audio file while preserving non-song audio. It is to be appreciated that another type of correlation or reductions in power level can be implemented by the second subtraction component 110 to remove the sound recording from the new mixed audio recording. It is also to be appreciated that other types of signal processing algorithms can be used to remove the sound recording from the new mixed audio recording.

While FIG. 1 depicts separate components in system 100, it is to be appreciated that the components may be implemented in a common component. In one example, the identification component 104 and the processing component 106 (e.g., the first subtraction component 108 and/or the second subtraction component 110) can be included in a single component. Further, it can be appreciated that the design of system 100 can include other component selections, component placements, etc., to remove a sound recording from an audio recording.

Figure 2:
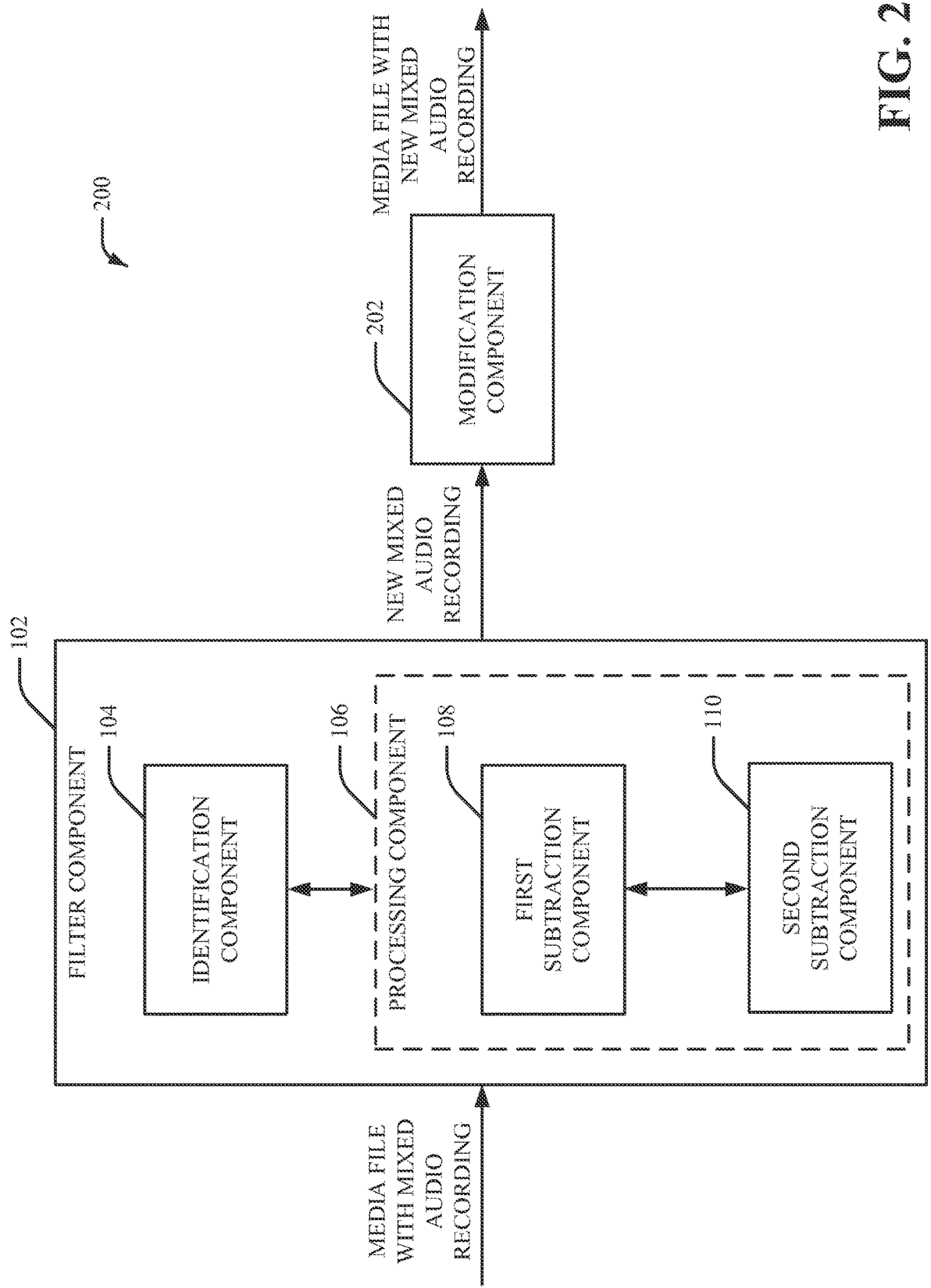
FIG. 2 illustrates an example system for removing a sound recording from an audio recording, in accordance with various aspects and implementations described herein.

Referring now to FIG. 2, there is illustrated a non-limiting implementation of a system 200 in accordance with various aspects and implementations of this disclosure. The system 200 includes the filter component 102 and a modification component 202. The filter component 102 includes the identification component 104 and the processing component 106. The processing component 106 includes the first subtraction component 108 and the second subtraction component 110.

The filter component 102 can receive a media file (e.g., a video file) with the mixed audio recording (e.g., the first audio file). For example, the mixed audio recording can be embedded in the media file. The media file can be uploaded to and/or stored on a remote server (e.g., a media content server). The modification component 202 can receive the new mixed audio recording (e.g., the second audio file) generated by the filter component 102. The modification component 202 can replace the mixed audio recording (e.g., the first audio file) embedded in the media file with the new mixed audio recording (e.g., the second audio file). For example, the modification component 202 can re-process the media file to include the new mixed audio recording (e.g., the second audio file). As such, one or more sound recordings (e.g., copyrighted content) can be removed from the media file. Additionally or alternatively, the modification component 202 can add one or more songs to the new mixed audio recording (e.g., the second audio file). For example, the modification component 202 can add a cover song (e.g., a re-recorded song, a non-copyrighted version of a song) to the new mixed audio recording. Therefore, a copyrighted sound recording (e.g., a copyrighted song) removed by the filter component 102 can be replaced with a non-copyrighted version of the sound recording (e.g., a non-copyrighted version of the copyrighted song).

Figure 3:
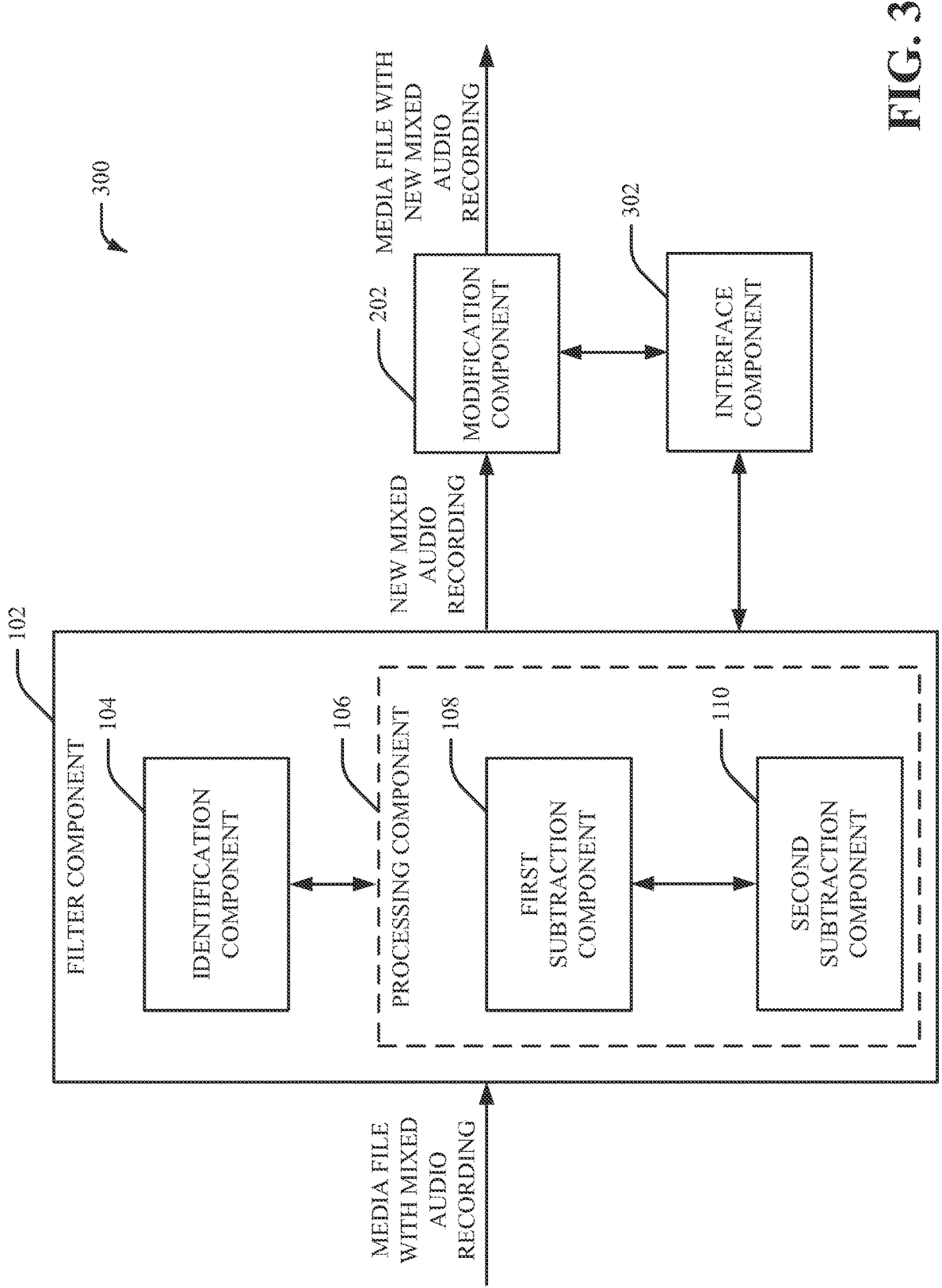
FIG. 3 illustrates an example system for removing a sound recording selected by a user from an audio recording, in accordance with various aspects and implementations described herein.

Referring now to FIG. 3, there is illustrated a non-limiting implementation of a system 300 in accordance with various aspects and implementations of this disclosure. The system 300 includes the filter component 102, the modification component 202 and an interface component 302. The filter component 102 includes the identification component 104 and the processing component 106. The processing component 106 includes the first subtraction component 108 and the second subtraction component 110.

The system 300 can be integrated with a cloud-based video editor. The interface component 302 can present a user with an option to remove one or more sound recordings from a media file. For example, the interface component 302 can generate a user interface for the user to allow the user to view each of the one or more sound recordings in the mixed audio recording (e.g., in the media file). At least one of the one or more sound recordings can be selected by the user (e.g., the user can select which of the one or more sound recordings to remove from the mixed audio recording). Therefore, the user can manually specify the sound recording that will be removed from the mixed audio recording. In one example, the interface component 302 can present the user with one or non-copyrighted versions of the one or more sound recordings. Therefore, the interface component 302 can allow the user to replace the one or more sound recordings in the media file with the one or more non-copyrighted versions of the one or more sound recordings.

The interface component 302 can also present the user with information (e.g., a notification, an email notification, etc.) regarding policies (e.g., ownership and/or licensing policies) for the one or more sound recordings. Additionally, the interface component 302 can also present the user with the results (e.g., effects) of not removing the one or more sound recordings from the mixed audio recording (e.g., the media file). For example, the interface component 302 can notify the user that an account associated with the user may be penalized for not removing the media file (e.g., the video file) containing the one or more sound recordings, the media file may be removed from the server, etc.

In one example, the interface component 302 provides a user with a list of one or more already-existing policy outcomes of not removing each of the one or more sound recordings (e.g., one or more copyrighted songs) from the media file. For example, the interface component 302 can present to a user an already-existing policy outcome of leaving one or more copyrighted songs in a video (e.g., a video file). An already-existing policy outcome can include, but is not limited to, muting an entire audio track for a video, blocking playback of a video in one or more geographical locations (e.g., countries), not allowing a video to display advertisements, etc. Additionally, the interface component 302 can notify a user that the already-existing policy outcome(s) can be reversed by removing (e.g., erasing) the relevant sound recordings (e.g., copyrighted songs) from the video. For example, the interface component 302 can present a notification to a user which states that a particular video is blocked in one or more countries due to the presence of a particular copyrighted song. Additionally, the notification can state that removal of the particular copyrighted song will result in the video being unblocked globally (e.g., unblocked in each of the one or more countries).

Figure 4:
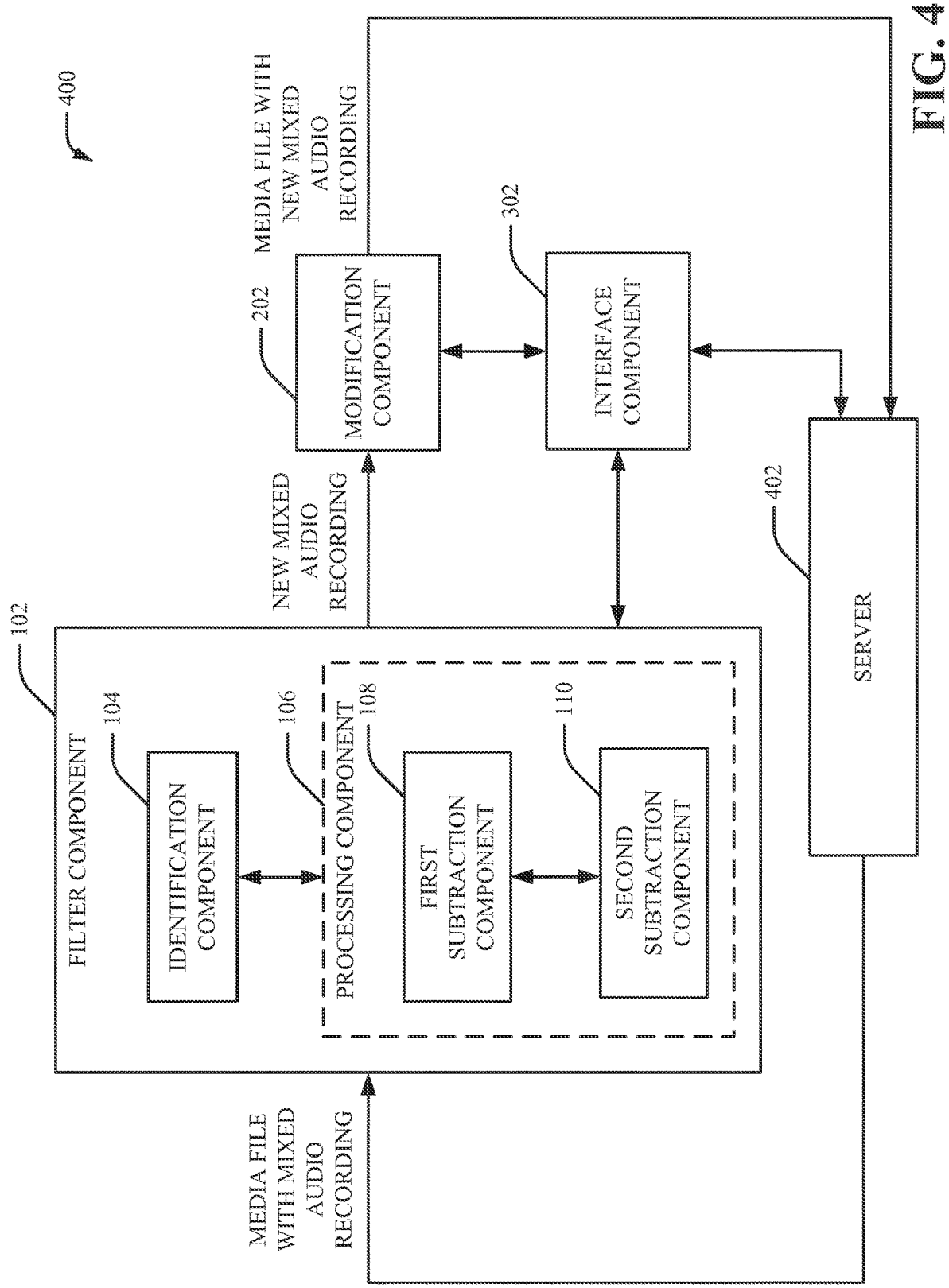
FIG. 4 illustrates another example system for removing a sound recording from an audio recording, in accordance with various aspects and implementations described herein.

Referring to FIG. 4, there is illustrated a non-limiting implementation of a system 400 in accordance with various aspects and implementations of this disclosure. The system 400 includes the filter component 102, the modification component 202, the interface component 302 and a server 402. The filter component 102 includes the identification component 104 and the processing component 106. The processing component 106 includes the first subtraction component 108 and the second subtraction component 110.

The filter component 102 can receive a media file (e.g., a video file) with the mixed audio recording (e.g., the first audio file) from a server 402. For example, the mixed audio recording can be embedded in a media file stored on the server 402. The media file can be uploaded to and/or stored on the server 402 (e.g., a media content server 402). In one example, the server 402 can be a remote server (e.g., a remote media content server). The modification component 202 can receive the new mixed audio recording (e.g., the second audio file) generated by the filter component 102. The modification component 202 can replace the mixed audio recording (e.g., the first audio file) embedded in the media file with the new mixed audio recording (e.g., the second audio file). For example, the modification component 202 can re-process the media file (e.g., generate a new media file) to include the new mixed audio recording (e.g., the second audio file). As such, one or more sound recordings (e.g., copyrighted content) can be removed from the media file and/or a new media file without the one or more sound recordings (e.g., copyrighted content) can be generated. Furthermore, the modification component 202 can replace the media file (e.g., the media file with the mixed audio recording) stored on the server 402 with the new media file (e.g. the new media file with the new mixed audio recording). As such, the new media file (e.g., re-processed media file) without copyrighted content can be stored on the server 402.

Figure 5:
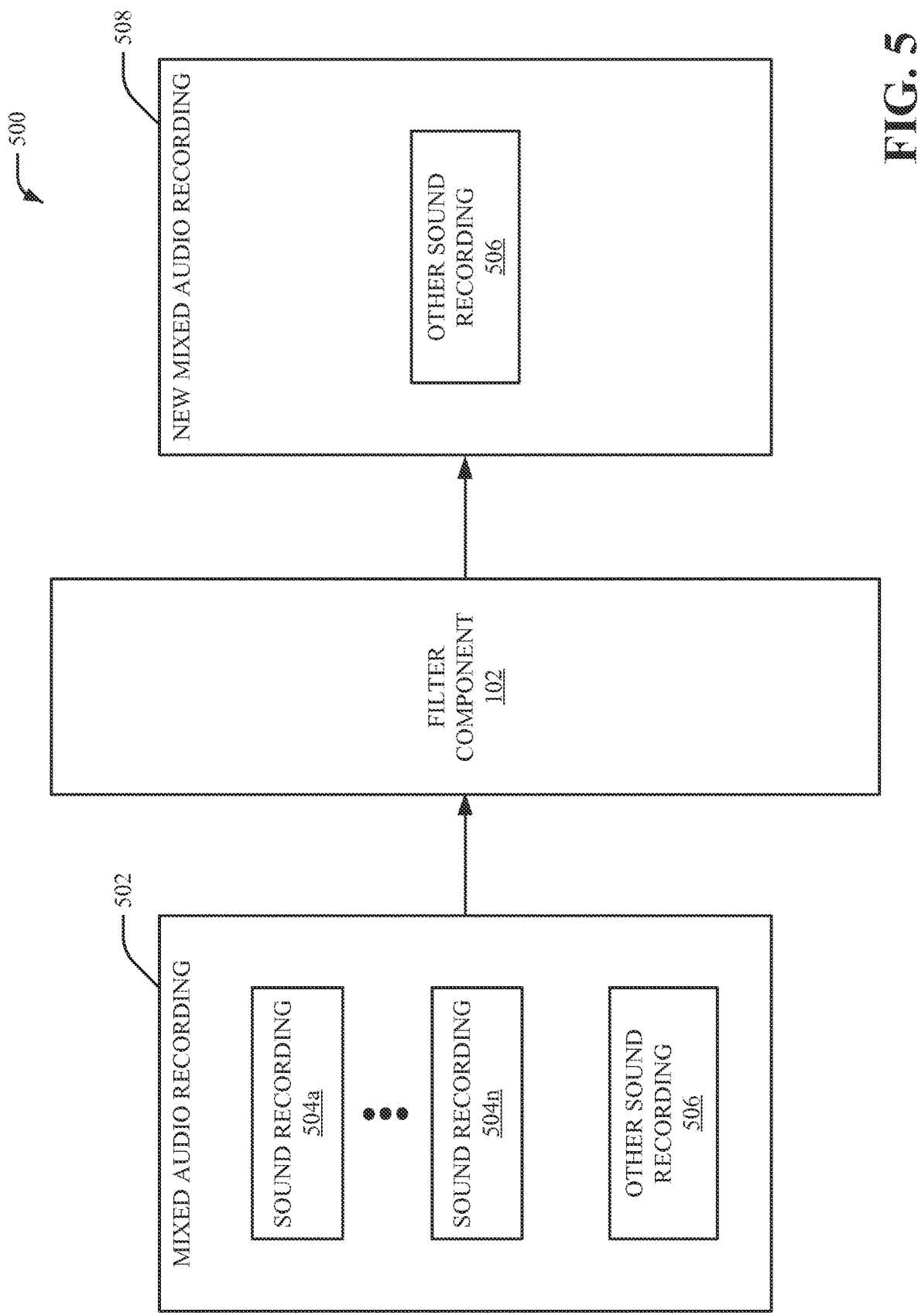
FIG. 5 illustrates example audio recordings, in accordance with various aspects and implementations described herein.

Referring to FIG. 5, there is illustrated a non-limiting implementation of a system 500 in accordance with various aspects and implementations of this disclosure. The system 500 includes a mixed audio recording 502. For example, the mixed audio recording 502 can be a hybrid sound recording (e.g., a hybrid sound signal, a soundtrack, etc.). The mixed audio recording 502 includes one or more sound recordings 504a-n and at least one other sound recording 506. In one example, the one or more sound recordings 504a-n can be one or more songs (e.g., one or more copyrighted songs). The at least one other sound recording 506 can be, for example, non-song audio content (e.g., speech) and/or a non-copyrighted sound recording (e.g., a non-copyrighted song, a non-copyrighted audio recording, etc.).

The filter component 102 can receive the mixed audio recording 502. In response to receiving the mixed audio recording, the filter component 102 (e.g., the identification component 104 and/or the processing component 106) can generate a new mixed audio recording 508. The new mixed audio recording 508 can be an audio recording without at least one of the one or more sound recordings 504a-n. For example, as shown in FIG. 5, the new mixed audio recording includes the at least one other sound recording 506. However, the one or more song recordings 504a-n are removed from the new mixed audio recording 508.

Figure 6:
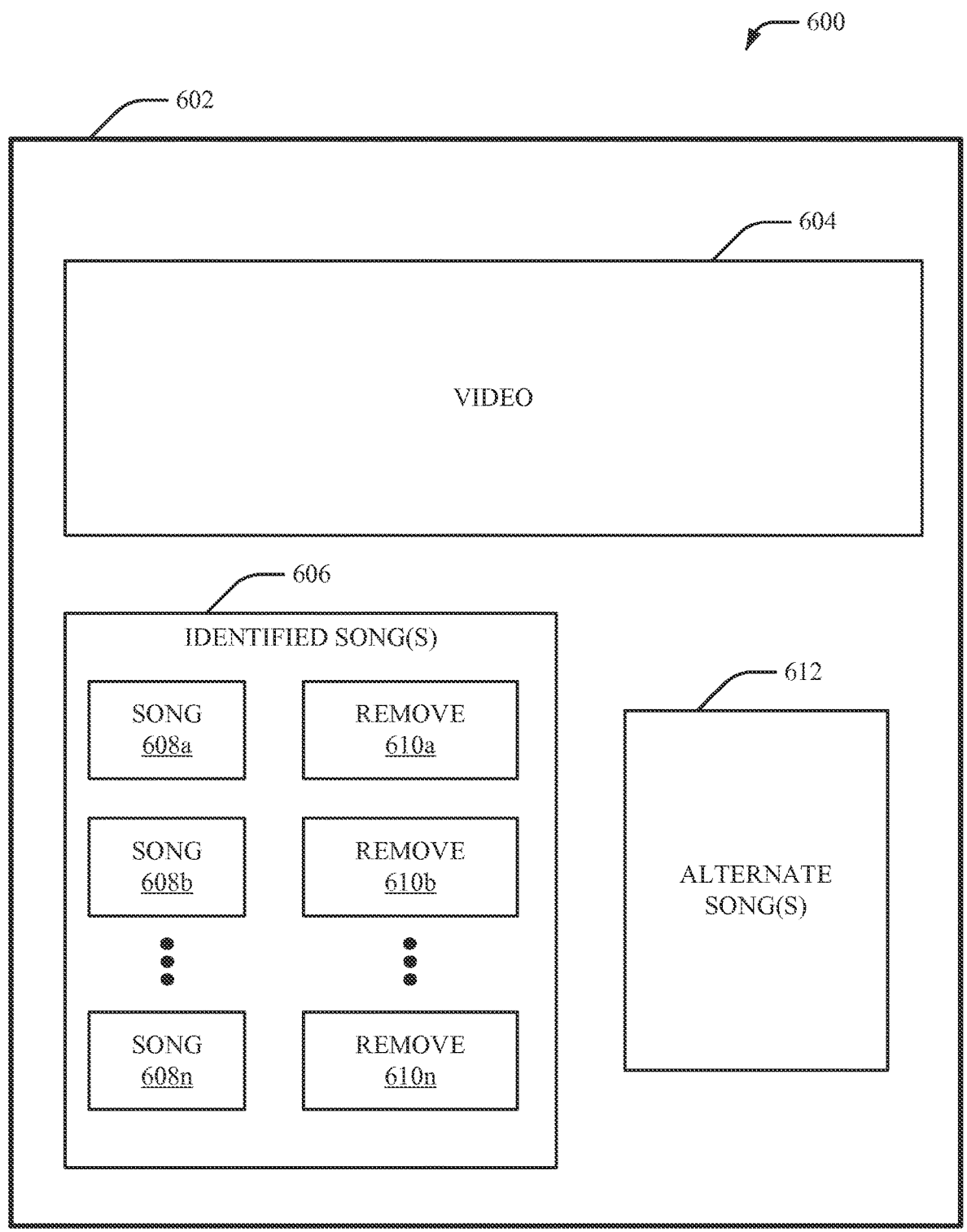
FIG. 6 illustrates an example user interface, in accordance with various aspects and implementations described herein.

Referring to FIG. 6, there is illustrated a non-limiting implementation of a system 600, in accordance with various aspects and implementations of this disclosure. The system 600 illustrates an example webpage 602 (e.g., a user interface to allow a user to view and/or remove one or more sound recordings embedded in a video 604). In one example, the webpage 602 can be a video hosting website. The webpage 602 can include the video (e.g., media content) 604, an identified song(s) section 606 and an alternate song(s) section 612. The identified song(s) section 606 can include one or more songs (e.g., identified songs) 608a-n and one or more remove buttons 610a-n. As such, a user can view each of the one or more songs 608a-n embedded in the video 604 (e.g., a mixed audio recording of the video 604). The user can remove at least one of the one or more songs 608a-n from the video 604 (e.g. the mixed audio recording) by selecting a corresponding remove button 610a-n. Therefore, the user can manually specify the song(s) (e.g. the sound recording(s)) that will be removed from the video 604. Furthermore, the alternate song(s) section 612 can present the user with one or non-copyrighted versions of the one or more songs 608a-n and/or other non-copyrighted songs. Therefore, the user can choose to replace at least one of the one or more songs 608a-n in the video 604 with one or more non-copyrighted songs. It is to be appreciated that the webpage 602 is merely an example. Therefore, the location and/or content of the video 604, the identified song(s) section 606 and/or the alternate song(s) section 612 can be varied. Furthermore, the webpage 602 can include other features, content and/or functionalities not shown in FIG. 6.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 7-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible 'from any computer-readable device or storage media.

Figure 7:
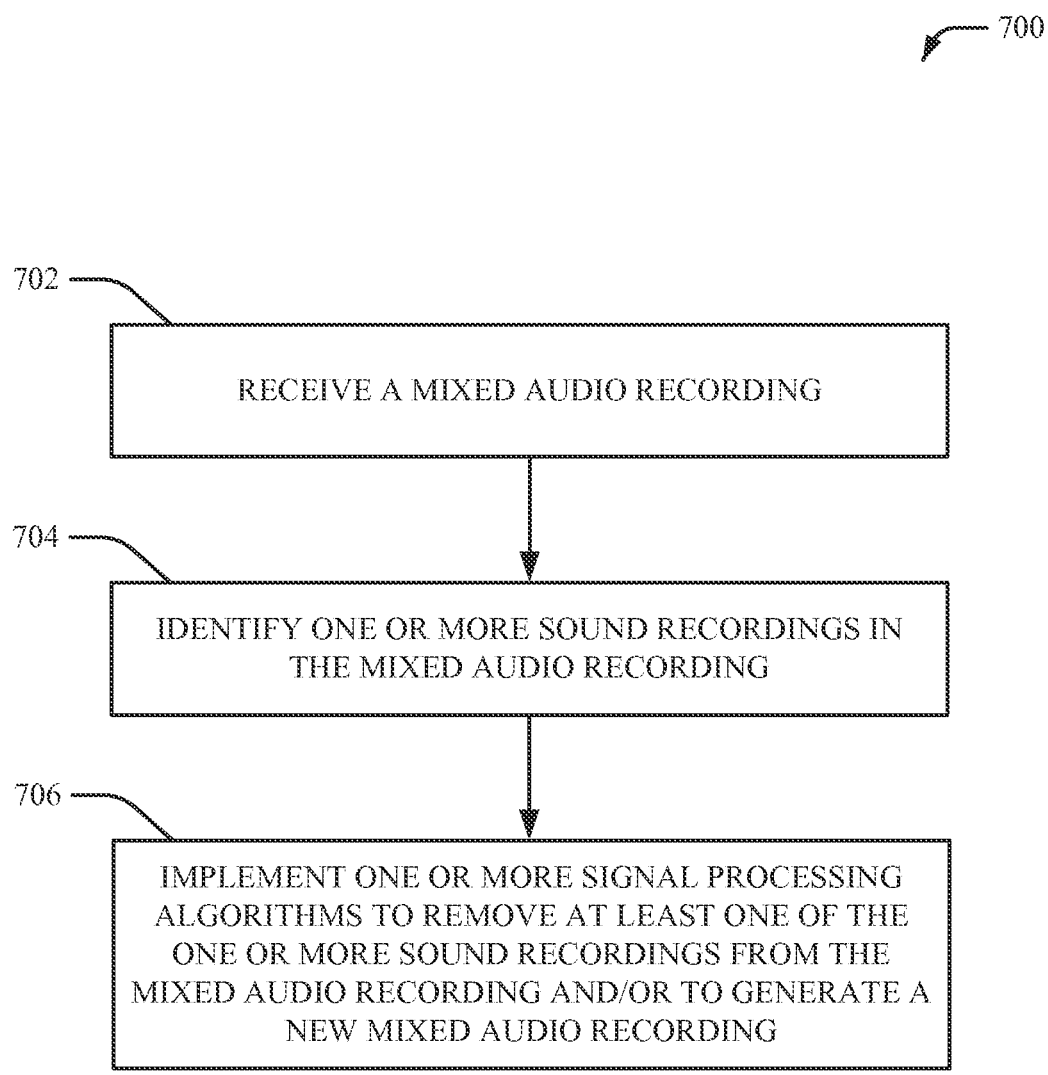
FIG. 7 depicts a flow diagram of an example method for removing a sound recording from an audio recording, in accordance with various aspects and implementations described herein.

Referring to FIG. 7, there illustrated is a methodology 700 for removing a sound recording from an audio recording, according to an aspect of the subject innovation. As an example, methodology 700 can be utilized in various applications, such as, but not limited to, network systems, computer network systems, communication systems, router systems, server systems, high availability server systems (e.g., Telecom server systems), Web server systems, file server systems, media server systems, disk array systems, powered insertion board systems, cloud-based systems, etc. Specifically, the methodology 700 can remove one or more sound recordings from an audio file to generate a new audio file without the one or more sound recordings.

At 702, a mixed audio recording can be received (e.g., by an identification component 104). For example, a mixed audio file embedded in a media file (e.g., a video file) can be received. At 704, one or more sound recordings in the mixed audio recording can be identified (e.g., by an identification component 104). For example, one or more songs in the mixed audio file can be identified. At 706, one or more signal processing algorithms can be implemented (e.g., by a first subtraction component 108 and/or a second subtraction component 110) to remove at least one of the one or more sound recordings from the mixed audio recording and/or to generate a new mixed audio recording. For example, at least one of the one or more songs in the mixed audio file can be removed from the mixed audio file by implementing adaptive filtering and/or spectral subtraction. In one example, a user can manually select at least one of the sound recordings to remove from the mixed audio recording. As such, a new mixed audio file (e.g., a modified audio file) can be generated without at least one of the one or more songs.

Figure 8:
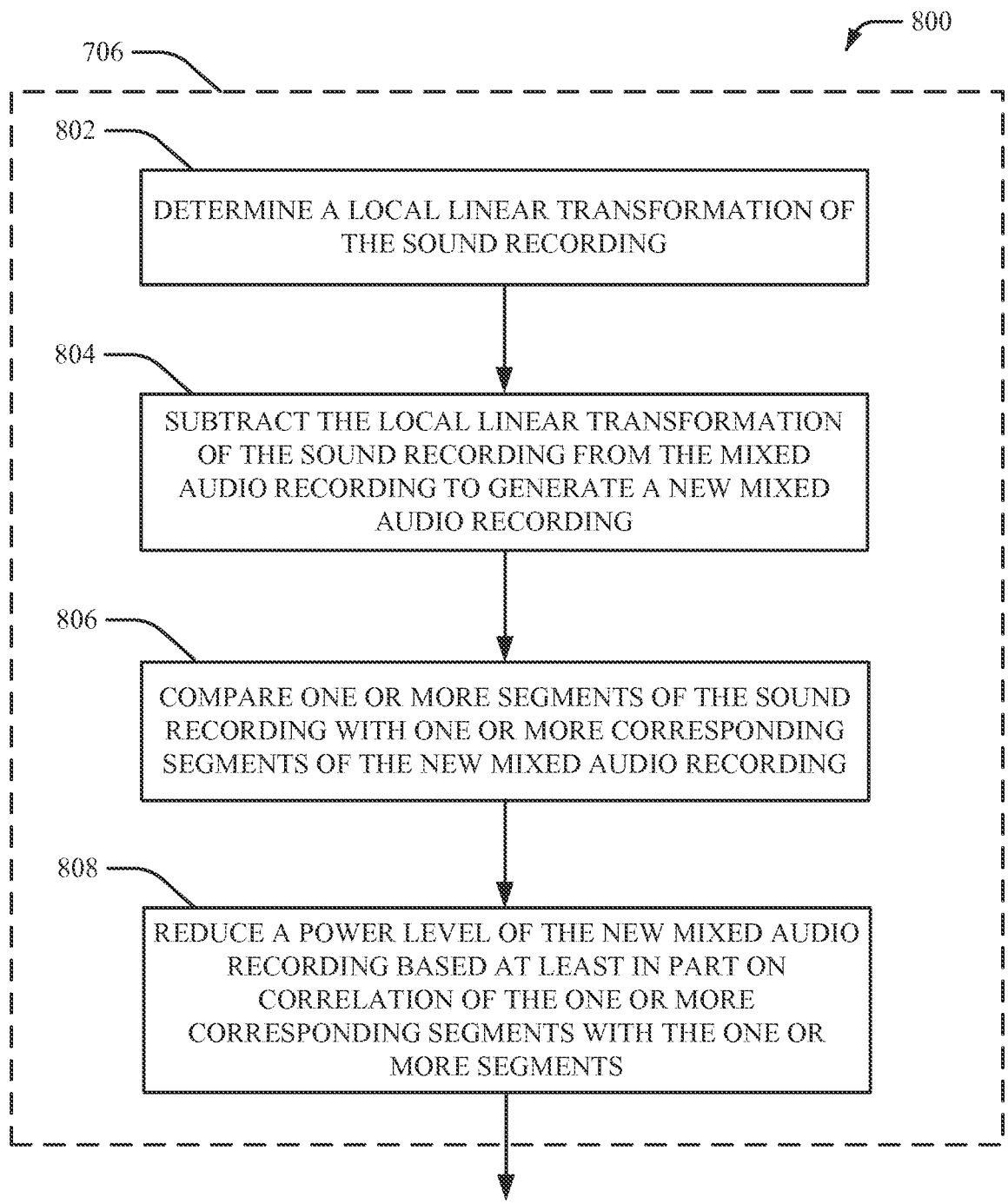
FIG. 8 depicts a flow diagram of an example method for implementing signal processing to remove a sound recording from an audio recording, in accordance with various aspects and implementations described herein.

Referring to FIG. 8, there illustrated is an example methodology 800 for implementing signal processing to remove a sound recording from an audio recording. The methodology 800 can provide further details for 706. At 802, a local linear transformation of the sound recording can be determined (e.g., using a first subtraction component 108). For example, the sound recording can be scaled at different offsets. At 804, the local linear transformation of the sound recording can be subtracted from the mixed audio recording to generate a new mixed audio recording (e.g., using a first subtraction component 108). For example, adaptive filtering can be implemented to subtract the local linear transformation of the sound recording from the mixed audio recording. As such a subtracted waveform (e.g., a new mixed audio recording) can be generated. At 806, one or more segments of the sound recording can be compared with one or more corresponding segments of the new mixed audio recording (e.g., using a second subtraction component 110). For example, a magnitude of the one or more segments of the sound recording can be compared with a corresponding magnitude of the one or more corresponding segments of the new mixed audio recording. In one example, a short-time Fourier transform of the one or more segments of the sound recording can be compared with a short-time Fourier transform of the one or more corresponding segments of the new mixed audio recording. At 808, a power level of the new mixed audio recording can be reduced (e.g., using a second subtraction component 110) based at least in part on correlation of the one or more corresponding segments with the one or more segments. For example, the second subtraction component 110 can reduce a power level of each of the one or more corresponding segments of the new mixed audio recording based at least in part on correlation of the one or more corresponding segments with the one or more segments. In one example, the power level of the new mixed audio recording can be reduced based on spectral correlation.

Figure 9:
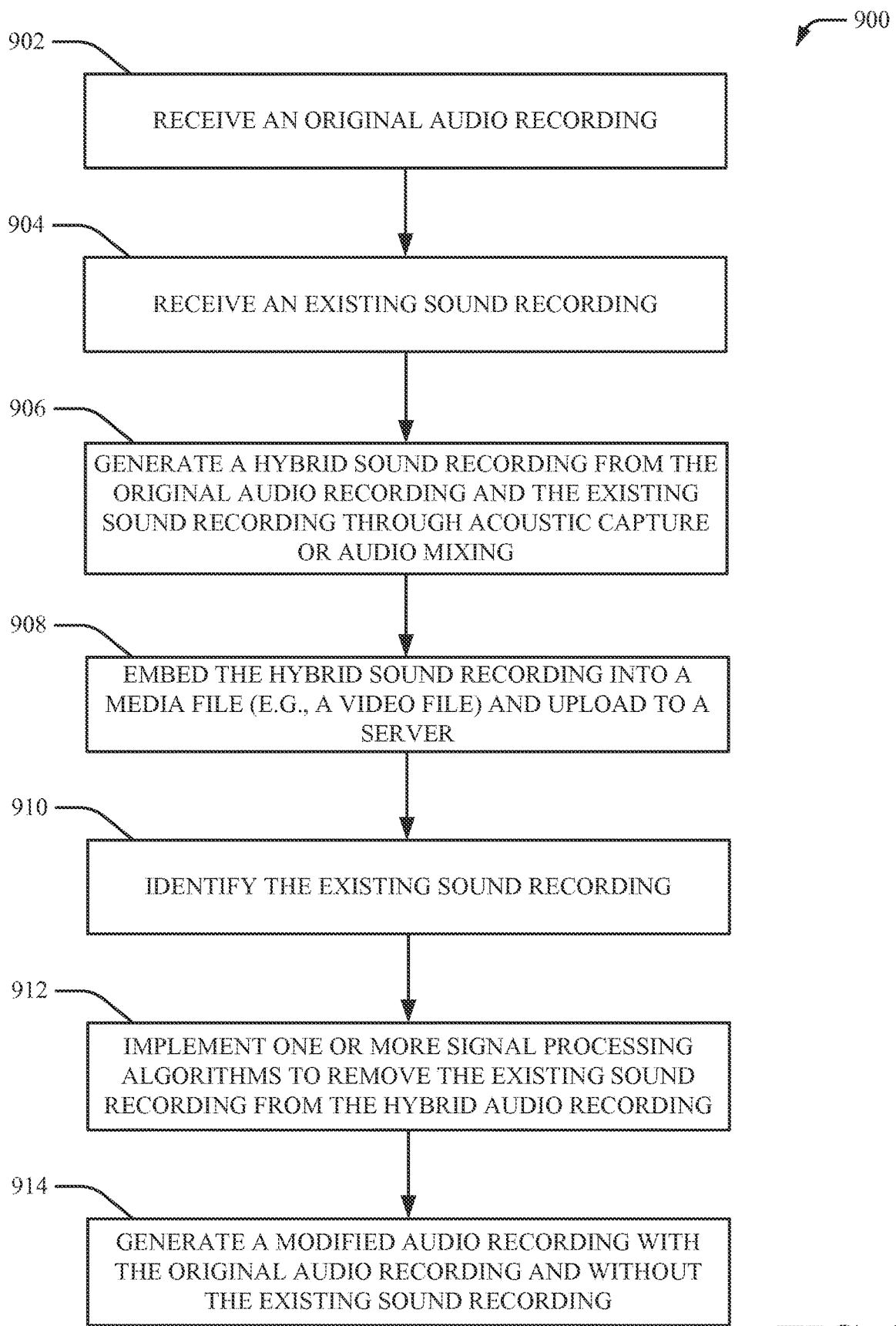
FIG. 9 depicts a flow diagram of an example method for removing a sound recording from an audio recording embedded in a media file, in accordance with various aspects and implementations described herein.

Referring to FIG. 9, there illustrated is an example methodology 900 for removing a sound recording from an audio recording embedded in a media file (e.g., a video file). At 902, an original audio recording can be received. For example, an audio recording of someone speaking can be received. At 904, an existing sound recording can be received. For example, a sound recording of a song (e.g., a copyrighted song) can be received. At 906, a hybrid sound recording can be generated from the original audio recording and the existing sound recording through acoustic capture or audio mixing. For example, a mixed sound recording can be generated from the original audio recording and the existing sound recording via an audio recording device (e.g., a microphone) or via audio mixing (e.g., an audio mixing process). At 908, the hybrid sound recording can be embedded into a media file and uploaded to a server. For example, the mixed sound recording (e.g., a soundtrack) can be embedded into a video file stored a server (e.g., a remote server, a media content server, etc.). At 910, the existing sound recording can be identified (e.g., by an identification component 104). For example, one or more existing sound recordings in the hybrid sound recording can be identified. At 912, one or more signal processing algorithms can be implemented (e.g., by a first subtraction component 108 and/or a second subtraction component 110) to remove the existing sound recording from the hybrid audio recording. For example, at least one of the one or more existing sound recordings in the hybrid sound recording can be removed from the hybrid sound recording by implementing adaptive filtering and/or spectral subtraction. At 914, a modified audio recording can be generated with the original audio recording and without the existing sound recording (e.g., by a first subtraction component 108 and/or a second subtraction component 110). For example, the modified audio recording can include only the original audio recording.

Figure 10:
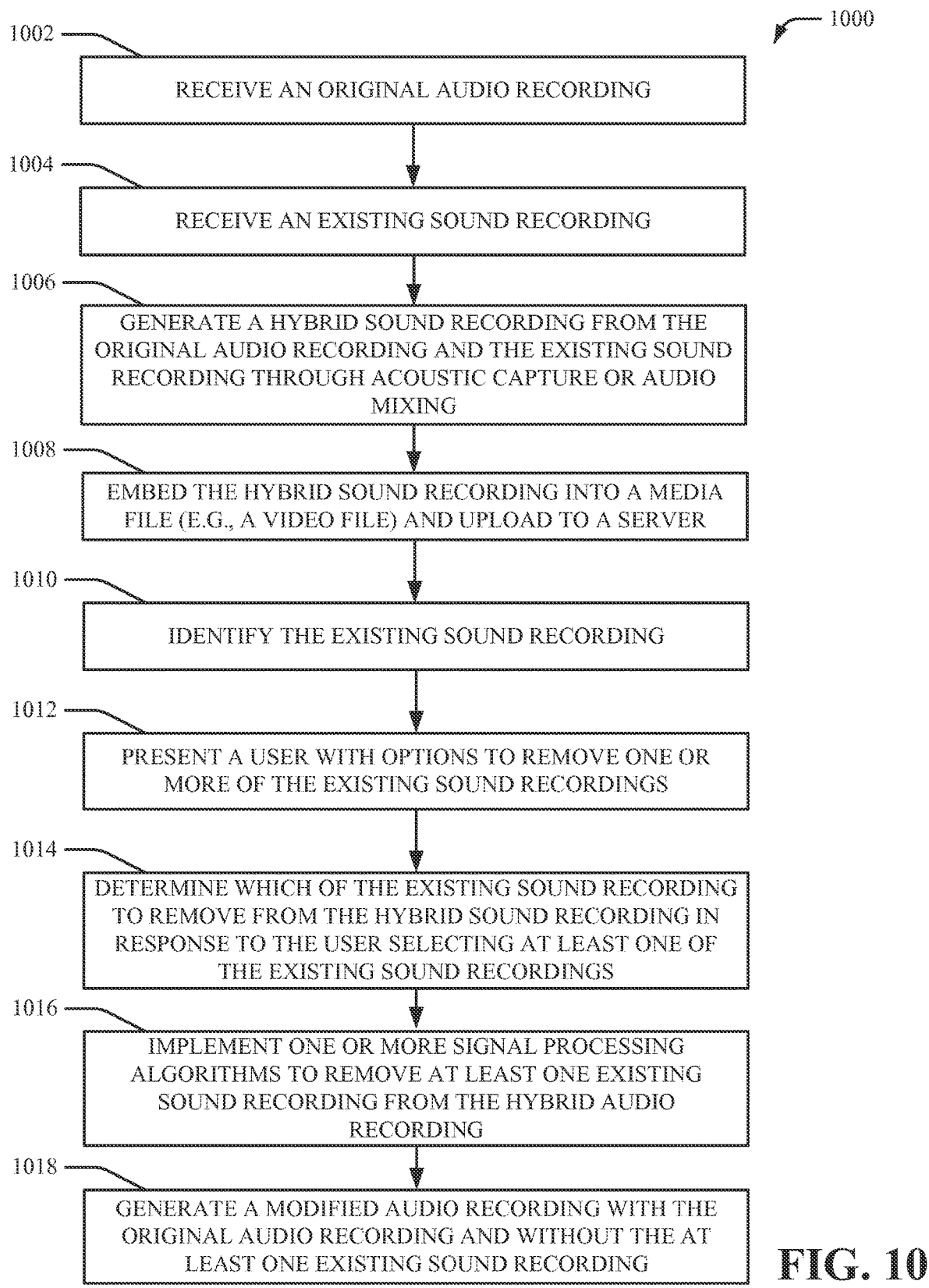
FIG. 10 depicts a flow diagram of an example method for removing a sound recording selected by a user from an audio recording embedded in a media file, in accordance with various aspects and implementations described herein.

Referring to FIG. 10, there illustrated is an example methodology 1000 for removing a sound recording selected by a user from an audio recording embedded in a media file (e.g., a video file). At 1002, an original audio recording can be received. For example, an audio recording of someone speaking can be received. At 1004, an existing sound recording can be received. For example, a sound recording of a song (e.g., a copyrighted song) can be received. At 1006, a hybrid sound recording can be generated from the original audio recording and the existing sound recording through acoustic capture or audio mixing. For example, a mixed sound recording can be generated from the original audio recording and the existing sound recording via an audio recording device (e.g., a microphone) or via audio mixing (e.g., an audio mixing process). At 1008, the hybrid sound recording can be embedded into a media file and uploaded to a server. For example, the mixed sound recording can be embedded into a video file stored a server (e.g., a remote server, a media content server, etc.). At 1010, the existing sound recording can be identified (e.g., by an identification component 104). For example, one or more existing sound recordings in the hybrid sound recording can be identified. At 1012, a user can be presented (e.g., by an interface component 302) with options to remove one or more of the existing sound recordings. For example, a user can be presented with each existing sound recording in the hybrid sound recording. Additionally, the user can be presented with an option to remove at least one of the existing sound recordings. At 1014, it can be determined which of the existing sound recordings to remove from the hybrid sound recording in response to the user selecting (e.g., using an interface component 302) at least one of the existing sound recordings to remove from the hybrid sound recording. For example, a user can choose at least one of the existing sound recordings to remove from the media file (e.g., the video file). At 1016, one or more signal processing algorithms can be implemented (e.g., by a first subtraction component 108 and/or a second subtraction component 110) to remove the at least one existing sound recording from the hybrid audio recording. For example, at least one of the one or more existing sound recordings selected by the user can be removed from the hybrid sound recording by implementing adaptive filtering and/or spectral subtraction. At 1018, a modified audio recording can be generated with the original audio recording and without the at least one existing sound recording (e.g., by a first subtraction component 108 and/or a second subtraction component 110). For example, a modified audio recording can be generated without the at least one existing sound recordings selected by the user.

Figure 11:
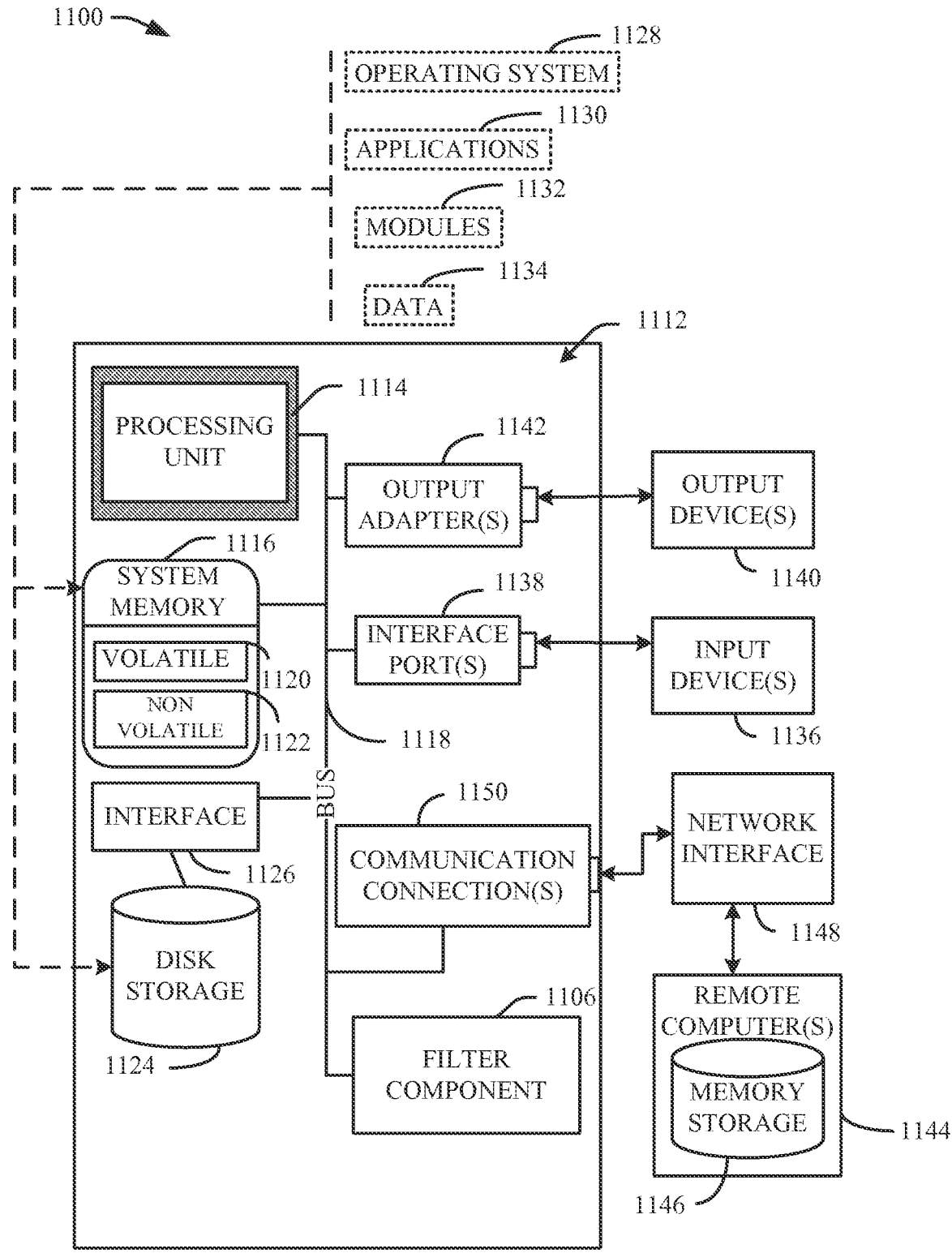
FIG. 11 is a schematic block diagram illustrating a suitable operating environment.
Figure 12:
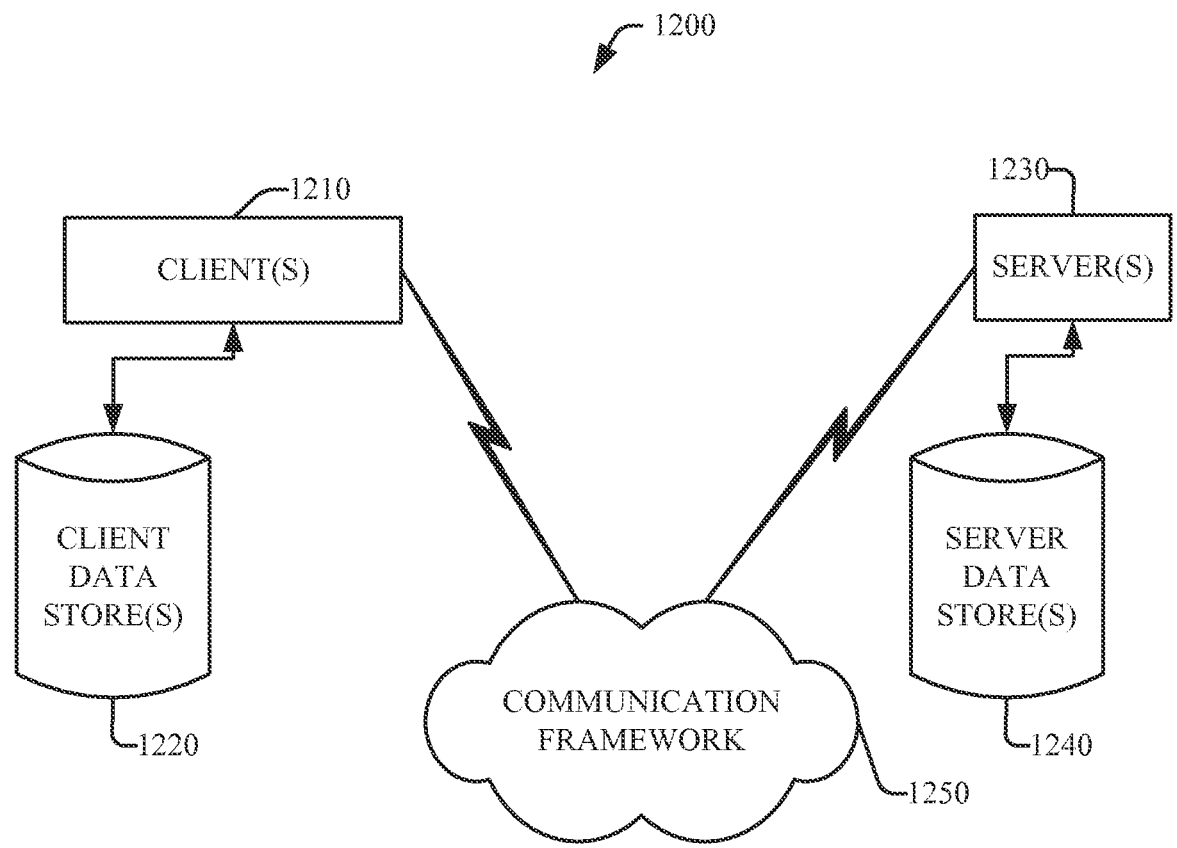
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer connection to the network interface 1148 includes, for exemplary purposes only, internal and external technologies such as, modems including regular telephone grade modems, cable modems and DSL modems, ISDN adapters, and Ethernet cards.

It is to be appreciated that the computer 1112 can be used in connection with implementing one or more of the systems or components shown and described in connection with FIGS. 1-5. In accordance with various aspects and implementations, the computer 1112 can be used to remove a sound recording from an audio recording (e.g., an audio recording embedded in a video file). In certain exemplary embodiments, the computer 1112 includes a filter component 1106 (e.g., the filter component 102) that can contain, for example, an identification component, a processing component, a detection component, a first subtraction component, a second subtraction component, a modification component and/or a interface component, each of which can respectively function as more fully disclosed herein.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "of" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., filter component, identification component, processing component, detection component, first subtraction component, second subtraction component, modification component, interface component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising:
a memory; and
a processor, operatively coupled with the memory, to:
receive a media file including a first audio file embedded in the media file, the first audio file including a plurality of sound recordings;
identify one or more protected sound recordings and one or more non-protected sound recordings that are included in the plurality of sound recordings;
provide an indication of a restriction associated with the media file and a result of removing the one or more protected sound recordings from the first audio file, wherein the restriction and the result are based on one or more policies of a content platform that change a playback of the media file in different geographical locations when accessing the content platform based on whether the one or more protected sound recordings remain in the media file;

receiving a notification comprising a selection of a user selectable option to remove the one or more protected sound recordings from the first audio file based on the indication;

apply one or more signal processing algorithms to the media file to remove at least one of the one or more protected sound recordings from the first audio file based on a modification of a frequency associated with the at least one of the one or more protected sound recordings to generate a second audio file that lacks the one or more protected sound recordings, the second audio file including at least the non-protected sound recordings; and replace the first audio file embedded in the media file with the second audio file.

2. The system of claim 1, wherein the second audio file includes at least one non-protected version of the at least one of the one or more protected sound recordings removed from the first audio file.

3. The system of claim 1, wherein the processor is further to:

present the user selectable option to remove one or more of the protected sound recordings.

4. The system of claim 1, wherein the processor is further to:

present respective user selectable options of non-protected versions of the one or more protected sound recordings to replace the one or more of the protected sound recordings in the second audio file wherein the at least one of the one or more sound recordings is selected by a user.

5. The system of claim 1, wherein the processor is further to:

present a user with information regarding one or more licensing policies associated with the one or more protected sound recordings embedded in the media file.

6. The system of claim 1, wherein the system is integrated with a cloud-based video editor.

7. The system of claim 1, wherein to apply the one or signal processing algorithms, the processor is further to:

determine a local linear transformation of the first audio file; and subtract the local linear transformation of the first audio file from the first audio file to generate the second audio file.

8. The system of claim 7, wherein the processor is further to:

compare one or more segments of the first audio file with one or more corresponding segments from the second audio file to identify one or more segments of the second audio file that correspond to the one or more protected sound recordings in the first audio file; and reduce a power level of the one or more segments of the second audio file that correspond to the one or more protected sound recordings in the first audio file.

9. A method comprising:

receiving a media file including a first audio file embedded in the media file, the first audio file including a plurality of sound recordings;

identifying one or more protected sound recordings and one or more non-protected sound recordings that are included in the plurality of sound recordings;

providing an indication of a restriction associated with the media file and a result of removing the one or more protected sound recordings from the first audio file, wherein the restriction and the result are based on one or more policies of a content platform that change a playback of the media file in different geographical locations when accessing the content platform based on whether the one or more protected sound recordings remain in the media file;

receiving a notification comprising a selection of a user selectable option to remove the one or more protected sound recordings from the first audio file based on the indication;

applying, by a processor, one or more signal processing algorithms to the media file to remove at least one of the one or more protected sound recordings from the first audio file based on a modification of a frequency associated with the at least one of the one or more protected sound recordings to generate a second audio file that lacks the one or more protected sound recordings, the second audio file including at least the non-protected sound recordings; and replacing the first audio file embedded in the media file with the second audio file.

10. The method of claim 9, wherein the second audio file includes at least one non-protected version of the at least one of the one or more protected sound recordings removed from the first audio file.

11. The method of claim 9, further comprising:

presenting the user selectable option to remove one or more of the protected sound recordings.

12. The method of claim 9, further comprising:

presenting respective user selectable options of non-protected versions of the one or more protected sound recordings to replace the one or more of the protected sound recordings in the second audio file wherein the at least one of the one or more sound recordings is selected by the user.

13. The method of claim 9, further comprising:

presenting the user with information regarding one or more licensing policies associated with the one or more protected sound recordings embedded in the media file.

14. The method of claim 9, wherein a system comprising the processor is integrated with a cloud-based video editor.

15. The method of claim 9, wherein applying the one or signal processing algorithms comprises:

determining a local linear transformation of the first audio file; and subtracting the local linear transformation of the first audio file from the first audio file to generate the second audio file.

16. The method of claim 15, further comprising:

comparing one or more segments of the first audio file with one or more corresponding segments from the second audio file to identify one or more segments of the second audio file that correspond to the one or more protected sound recordings in the first audio file; and reducing a power level of the one or more segments of the second audio file that correspond to the one or more protected sound recordings in the first audio file.

17. A method comprising:

receiving a media file from a client device of a user, the media file including a first audio file comprising protected audio content and non-protected audio content;

providing to the client device a user interface for removing the protected audio content, the user interface including a section indicative of the protected audio content included in the media file, an indication of a restriction associated with the media file and a result of removing the protected audio content from the first audio file, wherein the restriction and the result are based on one or more policies of a content platform that change a playback of the media file in different geographical locations when accessing the content platform based on whether the protected audio content remain in the media file, an option to remove the protected audio content, and a list of non-protected audio content that are each selectable to replace the protected audio content;

receiving a selection of the option to remove the protected audio content and a selection of a non-protected audio content from the list to replace the protected audio content included in the media file; and replacing the first audio file included in the media file with a second audio file based on the selection, the second audio file including the non-protected audio content of the first audio file and the user selected non-protected audio content.

18. The method of claim 17, further comprising:

presenting the user with information regarding one or more licensing policies associated with the protected audio content included in the first audio file.

19. The method of claim 17, further comprising:

presenting the user with a policy outcome including an action that will be performed if the protected audio content is not removed from the media file; and performing the action specified in the one or more policies of the content platform responsive to the protected audio content not being removed from the media file, the action comprising one of muting the first audio file, blocking playback of the media file, or preventing a display of advertisements with the media file.

* * * * *

UNITED STATES PATENT AND TRADEMARK OFFICE
CERTIFICATE OF CORRECTION

PATENT NO. : 11,003,413 B2  
APPLICATION NO. : 14/920463  
DATED : May 11, 2021  
INVENTOR(S) : Christopher Russell LaRosa et al.

It is certified that error appears in the above-identified patent and that said Letters Patent is hereby corrected as shown below:

In the Claims

In Claim 7, Column 19, Line 41, after "the one or" insert --more--

In Claim 15, Column 20, Line 42, after "the one or" insert --more--

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*